United States Patent

Scharland et al.

(10) Patent No.: US 7,694,119 B1
(45) Date of Patent: Apr. 6, 2010

(54) TECHNIQUES FOR DEVICE INITIALIZATION

(75) Inventors: Michael J. Scharland, Franklin, MA (US); James P. McCarthy, Wilmington, MA (US); Stephen R. Ives, West Boylston, MA (US)

(73) Assignee: EMC Corporation, Hopkinton, MA (US)

( * ) Notice: Subject to any disclaimer, the term of this patent is extended or adjusted under 35 U.S.C. 154(b) by 877 days.

(21) Appl. No.: 11/393,137

(22) Filed: Mar. 30, 2006

(51) Int. Cl.
*G06F 15/177* (2006.01)
(52) U.S. Cl. .............................................. 713/1; 713/2
(58) Field of Classification Search ..................... 713/1, 713/2
See application file for complete search history.

(56) References Cited

U.S. PATENT DOCUMENTS

| | | | |
|---|---|---|---|
| 5,206,939 A | 4/1993 | Yanai et al. | |
| 5,721,952 A * | 2/1998 | Lin et al. | 710/19 |
| 5,778,394 A | 7/1998 | Galtzur et al. | |
| 5,845,147 A | 12/1998 | Vishlitzky | |
| 5,857,208 A | 1/1999 | Ofek | |
| 6,584,544 B1 * | 6/2003 | Morley et al. | 711/114 |
| 7,181,586 B2 | 2/2007 | Dallmann et al. | |

OTHER PUBLICATIONS

U.S. Appl. No. 11/014,405, filed Dec. 16, 2004, Hwang, et al.

* cited by examiner

*Primary Examiner*—Tse Chen
(74) *Attorney, Agent, or Firm*—Muirhead and Saturnelli, LLC

(57) ABSTRACT

Described are techniques for initializing a device in a data storage system. An indicator is set in an entry associated with a portion of the device indicating that the portion of the device is to be initialized. A signature field of the entry is set with a signature value indicating that the portion of the device is to be initialized. The device is indicated as available for use after setting the indicator and the signature field for each portion of the device. The device has one or more portions and each of the portions has a corresponding entry including an indicator and a signature field.

20 Claims, 14 Drawing Sheets

TECHNIQUES FOR DEVICE INITIALIZATION

BACKGROUND

1. Technical Field

This application generally relates to a data storage system, and more particularly to techniques used with device initialization.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Different tasks may be performed in connection with devices of a data storage system. One task that may be performed in connection with a device of a data storage system is initialization or formatting of the device. One existing technique for initializing or formatting a device on a data storage system may include, in addition to other processing steps, initializing each track of the device such as with an initialization pattern.

The foregoing existing technique has some drawbacks. Initializing each track of the device may be very time consuming and use a lot of computing resources. A track may correspond to a portion of a physical storage such as, for example, multiple blocks on a data storage device. In connection with initializing each track on the device with an initialization pattern, the resources of the data storage system may be consumed to saturation so that the service time to process other requests such as, for example, host I/O operations, may be unacceptable. Additionally, the amount of time to perform the initialization prior to the device being available for use may also be unacceptable particularly as the capacity of devices and data storage systems increase.

The initialization may be performed in connection with different operations and commands. Initialization may be performed in connection with an application determining that a device should be initialized. For example, a snapshot application may be used in connection with making a snapshot or point in time copy of data from a first device to a second device. While the snapshot of data is in the process of being copied to the second device, a read operation to access data on the second device may be redirected to use a copy of data on the first device if the data has not yet been copied from the first device to the second device. If a snapshot application session is terminated prior to completion of making the snapshot on the second device, the snapshot application may set an indicator indicating that the second device requires initialization due to the incomplete and aborted snapshot operation.

Thus, it may be desirable to utilize a technique in connection with device initialization which efficiently utilizes resources of a data storage system and reduces the amount of time before the device is available for use. It may also be desirable that the technique be scalable as data storage capacity of the data storage system and devices therein increases.

SUMMARY OF THE INVENTION

In accordance with one aspect of the invention is a method for initializing a device in a data storage system comprising: setting an indicator in an entry associated with a portion of said device indicating that said portion of said device is to be initialized; setting a signature field in said entry with a signature value indicating that said portion of said device is to be initialized; and indicating that said device is available for use after setting said indicator and said signature field for each portion of said device, said device having one or more portions, each of said portions having a corresponding entry including an indicator and a signature field for said each portion. The signature value may be a first of a plurality of signature values, each of said signature values indicating an initialization state of said entry and said portion of said device. The first signature value may indicate that said entry includes invalid metadata describing said portion of said device. When the entry includes valid metadata describing said portion, said signature field may include a value used in connection with performing data validation when data included in said portion of said device is transmitted rather than a signature value. The method may also include writing an initialization value to said portion of said device, and, in response to writing said initialization value, said entry is updated by setting said indicator in said entry indicating that said portion of said device has been initialized, and setting said signature field in said entry to another value determined in accordance with the initialization value written to said portion of said device. The portion of said device may correspond to a portion of a physical device which includes user data. The portion of said device may correspond to a portion of a physical device which includes metadata about said device. The portion may not be addressable by a host performing I/O operations to said device. The device may be a new logical device, and said setting steps may be performed as part of initializing entries in a table including information about physical device tracks included in said new logical device. The method may also include: performing an I/O operation request to said portion; and initializing said portion of said device by writing an initialization value to said portion of said device in response to receiving said I/O operation request if said portion is determined to not be initialized in accordance with values of said indicator and said signature field. The method may also include: performing an I/O operation request to said portion; determining if said portion has been initialized using values of said indicator and said signature portion; if said I/O operation is a write operation and said portion has not been initialized, performing write initialization processing in accordance with values of said indicator and said signature field; and if said I/O operation is a read operation and said portion has not been initialized, performing read initialization processing in accordance with said values of said indicator and said signature field. The write initialization processing may include: determining if said write operation is a full write operation to write data to said entire portion; and if said write operation is a full write operation, storing write operation data to said portion without storing an initialization value to said portion. The method may also include performing, if said write operation is not a full write operation, storing an initialization value to said portion prior to storing write operation data to said portion. The method may also include performing, if said write operation is not a full write operation, storing an initialization value in a cache slot associated with said portion, storing write operation data to said cache slot associated with said portion, and destaging the data in the cache slot to the portion. A background process may examine entries in a device table, each entry corresponding to a different portion of said device, and the background process may initialize portions of said device in accordance with values of the indicator and the signature field of each of said entries corresponding to one of said portions. The read initialization processing may not initialize said entry to include valid metadata, may not initialize said portion of said device corresponding to said entry, and may return an initialization pattern in response to said read operation.

In accordance with another aspect of the invention is a computer-readable medium including code stored thereon for initializing a device in a data storage system, the computer-readable medium including code that: sets an indicator in an entry associated with a portion of said device indicating that said portion of said device is to be initialized; sets a signature field in said entry with a signature value indicating that said portion of said device is to be initialized; and indicates that said device is available for use after setting said indicator and said signature field for each portion of said device, said device having one or more portions, each of said portions having a corresponding entry including an indicator and a signature field for said each portion. The signature value may be a first of a plurality of signature values, each of said signature values indicating an initialization state of said entry and said portion of said device. The first signature value may indicate that said entry includes invalid metadata describing said portion of said device. When the entry includes valid metadata describing said portion, said signature field may include a value used in connection with performing data validation when data included in said portion of said device is transmitted rather than a signature value.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
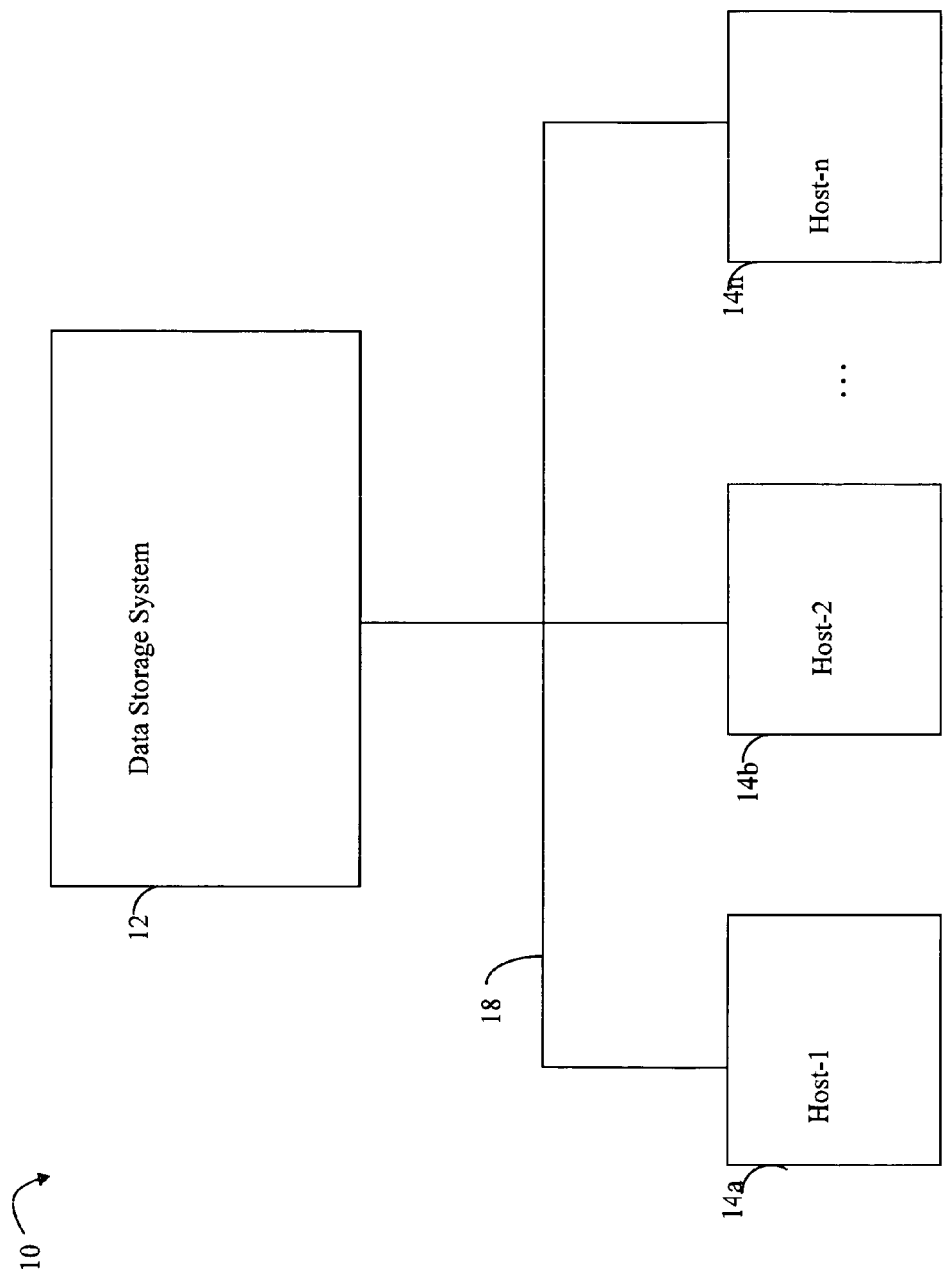
FIG. 1 is an example of an embodiment of a computer system that may utilize the techniques described herein.

Referring now to FIG. 1, shown is an example of an embodiment of a computer system that may be used in performing the techniques described herein. The computer system 10 includes a data storage system 12 connected to host systems 14a-14n through communication medium 18. In this embodiment of the computer system 10 and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment.

Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
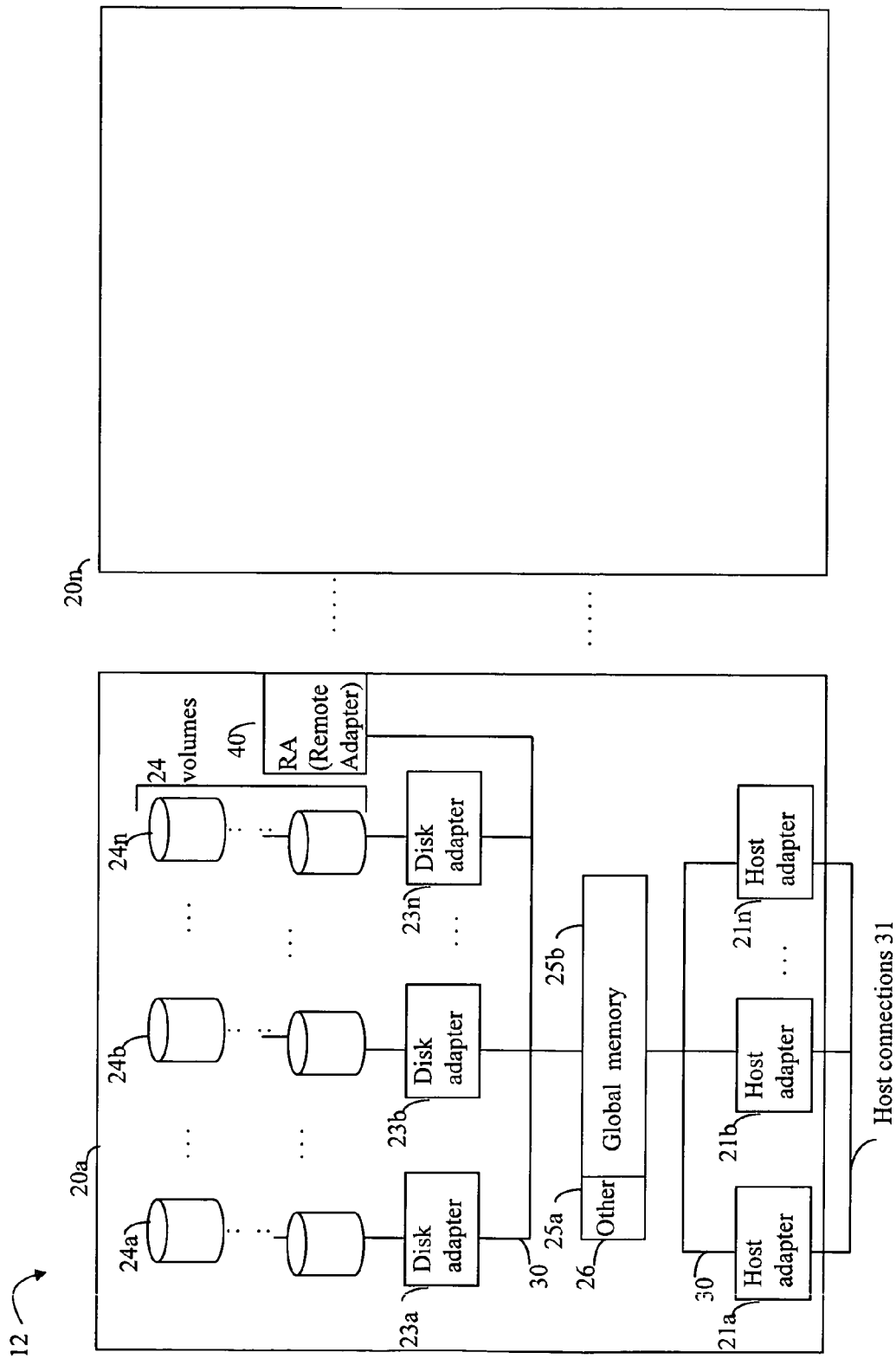
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
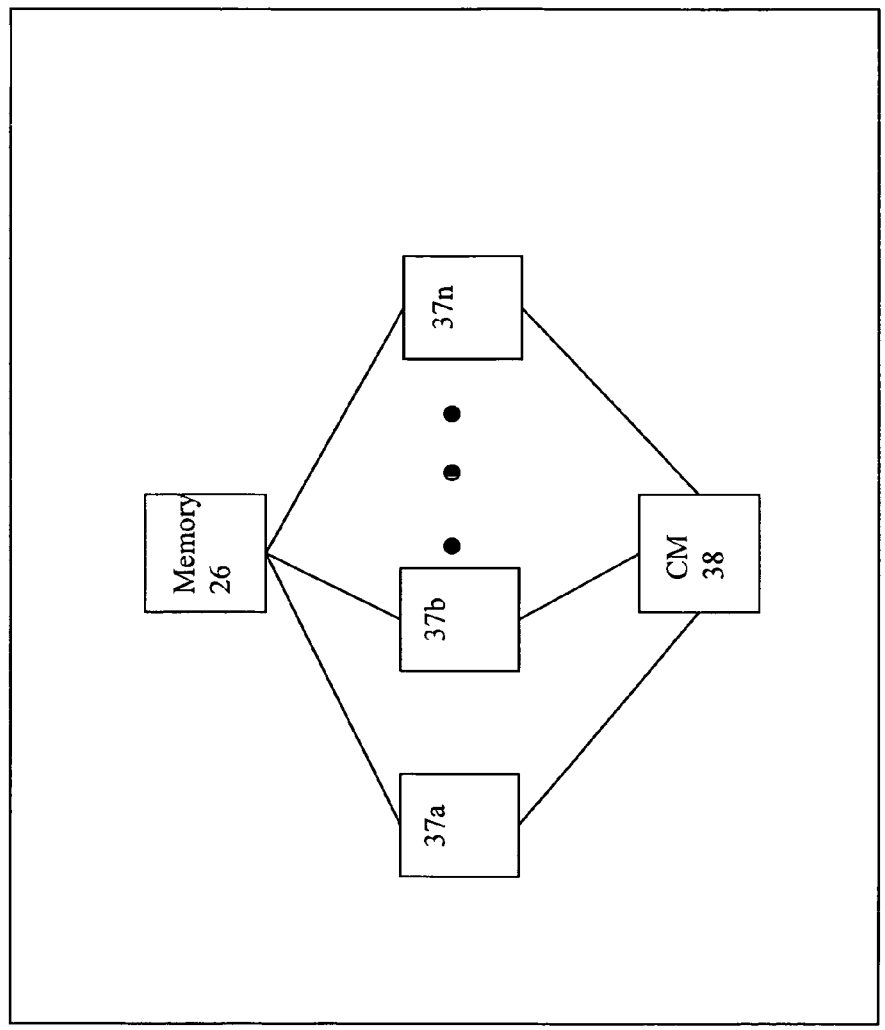
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
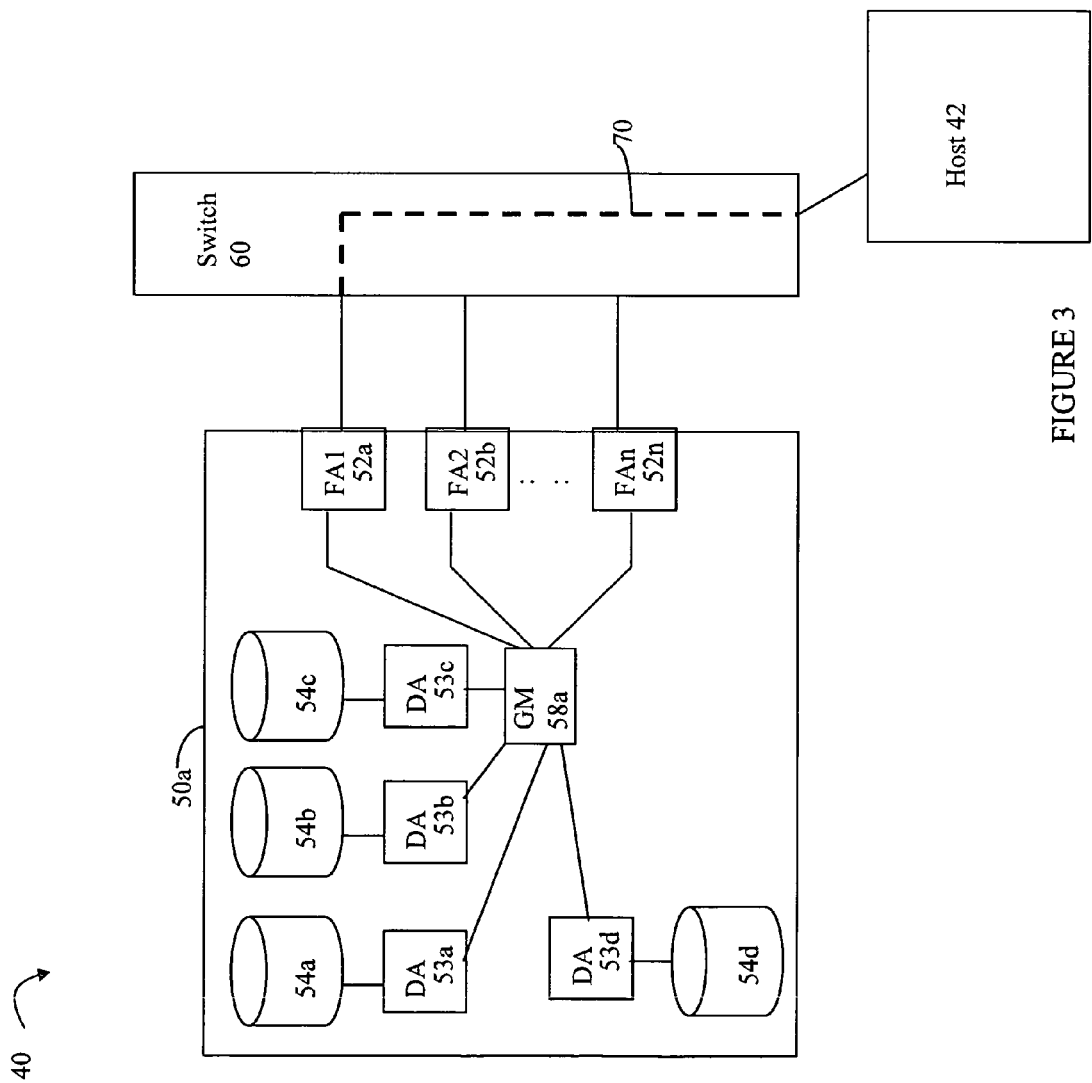
FIG. 3 is a more detailed example of an embodiment of a computer system that may utilize the techniques described herein.

Referring now to FIG. 3, shown is an example of an embodiment of a computer system 40 that may be used in connection with the techniques described herein. It should be noted that the embodiment illustrated in FIG. 3 presents a simplified view of some of the components of a computer system as generally illustrated in FIGS. 1 and 2A, for example, including only some detail of the data storage system 50a for the sake of illustration.

Included in the system 40 is data storage system 50a, a switch 60 and a host 42. The data storage system 50a and the host 42 may communicate using switch 60. In this example, the data storage system 50a includes data storage devices 54a-54d, DAs 53a-53d, global memory (GM) 58a, and multiple Fibre Channel Adapters (FAs) 52a-52n. Each of the FAs 52a-52n has a Fibre Channel connection to the switch 60 to facilitate communications with the host 42. The host 42 may issue a command to data storage system 50a through switch 60 over path 70 to one of the FAs 52a-52n.

A command may be issued from the host 42 to perform an I/O operation, such as a read or write request, with respect to data stored on a device on the data storage system 50a.

With reference to FIG. 3, the I/O operation may be issued from the host 42 to the data storage system 50a. The host may communicate with FA 1 52a. FA 1 52a may execute code to communicate with the DAs as needed in performing the I/O operation. The FAs may communicate with the DAs using any one of variety of different techniques that may vary with embodiment. For example, the FAs may communicate with the DAs through use of a messaging technique with a request buffer in GM. In one embodiment, an FA may place a message in the request buffer of the GM for one or more DAs. Each of the DAs may poll the request buffer for incoming messages which are directed to each DA. When a DA has processed a message from the request buffer, the DA may communicate a status or other information to the FA also through the request buffer. It should be noted that other embodiments may use other techniques to facilitate communications between components of the data storage systems than as described herein. For example, an embodiment may use an alternative technique which utilizes, for example, event notification techniques rather than a polling technique. These and other variations will be appreciated by those of ordinary skill in the art.

In connection with returning data to a host, for example, from one of the devices such as 54a, data may be copied from 54a by the DA servicing requests for device 54a. In FIG. 3, the DA servicing device 54a is DA 53a. Data may be copied from device 53a by DA 54a to GM (Global Memory) 58a. Data from GM 58a may then be communicated to one of FA 52a-52n, switch 60, and then to the host 42.

In connection with performing operations, such as in connection with an I/O operation for a device, a track id table which includes device information may be used in an embodiment.

Figure 4:
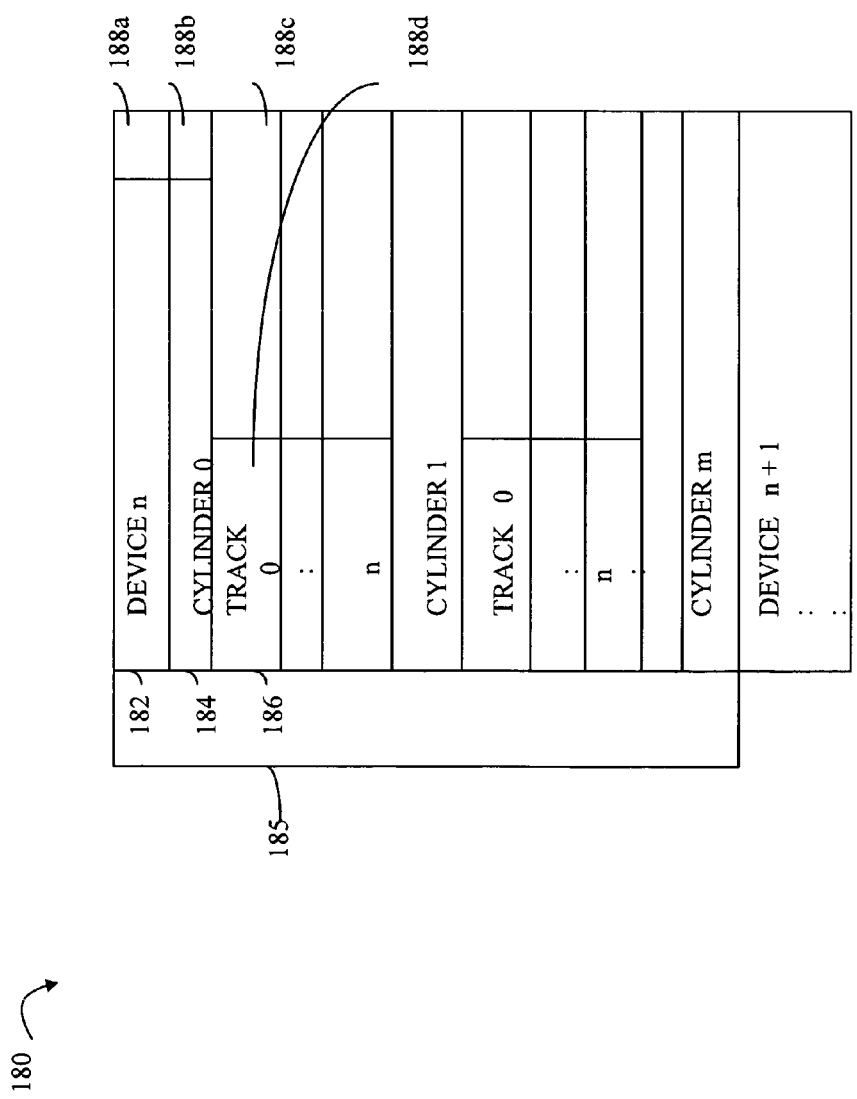
FIG. 4 is an example of an embodiment of a track id table.

Referring now to FIG. 4, shown is an example of a representation of a track id table 180. The table 180 may be organized on a device-by-device level to indicate device state information for a particular portion of a device. Such information may include, for example, if the data from the portion is in cache, and if so, where in cache is it located. An embodiment that includes devices, for example, such as disks, may include a further refinement or granularity in the table 180 corresponding to a location in cache. The table 180 may also be used to store other information about each particular track as will be explained in more detail below. The table 180 may be stored in a portion of GM as illustrated in other figures herein.

The table 180 may include a hierarchical structure relative to the structure of a disk, such as cylinders and tracks on a disk. In one embodiment, a track may be a 32K or 64K byte portion aligned with the beginning of the device and a cylinder may be 15 tracks. Other embodiments may use different structures and/or sizes. Each device, such as device n, may have a corresponding portion 185 included in the table. Each of the portions 185 may further be divided into sections in accordance with the disk structure. A portion 185 may include device header information 182, information for each cylinder 184, and for each track within each cylinder 186. For a device, a bit indicator 188a may indicate whether data associated with the device is stored in cache. The bit indicator 188b may further indicate for a particular cylinder within a device, is any data stored in the cache. Associated with each track may be a corresponding portion 188c which may include information about a particular track. In one embodiment, portion 188c may indicate whether data associated with a particular track is in the cache and an associated address of where in the cache the data for a particular track may be found, for example, in connection with performing a read operation or a pending write operation. The portion 188c may include other information associated with a particular track, such as a valid cache address if data is stored in the cache for the particular track. The portion 188c may also include one or more bit flag indicators and other information related to each device track.

It should be noted that the information in the track id table may be characterized as metadata about a particular track and its associated state.

Figure 5:
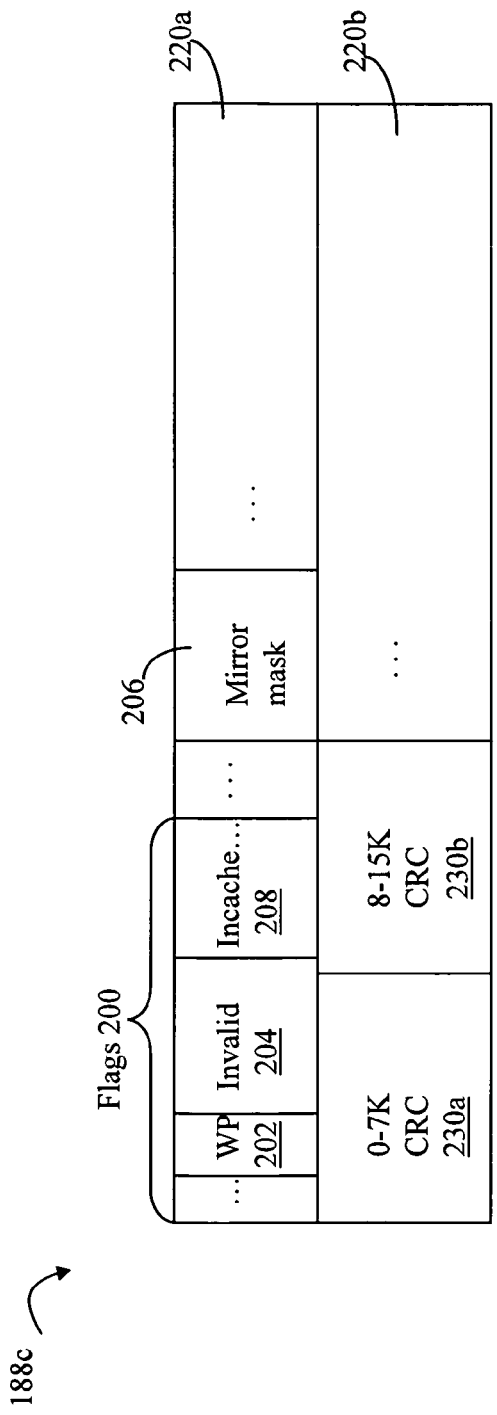
FIG. 5 is an example of an embodiment of a portion of an entry in the table of FIG. 4.

Referring now to FIG. 5, shown is an example representation of information that may be included in an embodiment of portion 188c as illustrated in the track id table of FIG. 4. The portion 188c is associated with a track of a device and included in the track id table. FIG. 5 shows in more detail, for example, particular bit flags that may be associated with a track. It should be noted that although FIG. 5 refers specifically to element 188c which corresponds to track 0 of device N, it should be noted that other tracks may include similar information as generally described in connection with section 188c.

In one embodiment, each entry of the track id table as represented by 188a may be 16 bytes, although other embodiments may utilize other sizes and data layouts than as illustrated in FIG. 5. The first 8 bytes of the entry may be in accordance with the layout illustrated by 220a. The last 8 bytes of the entry may be in accordance with the layout illustrated by 220b. Portion 220a may include flags 200, a mirror mask 206, and other information. Portion 220b may include CRC (Cyclical Redundancy Checking) values that may be used in connection with performing error checking for data portions stored on the device. Techniques using CRC values, such as to ensure the accuracy of transmitting and storage of data on the device, are known in the art. The portion 220b includes CRC values for 8K device data portions. For example, portion 230a may include the CRC value for bytes 0-7K of data of a track, portion 230b may include the CRC value for bytes 8-15K of data of the same track, and so on.

As illustrated in 220a, entries of the track id table may include a mirror mask bit setting 206 indicating which particular mirrors are associated with a data storage device. For example, in one embodiment, a data storage device may have up to four mirrors. Accordingly, the bit mask may have four bits, one corresponding to each possible mirror. A mirror having its corresponding bit within the mask 206 set (e.g., 1)

indicates that the mirror is enabled for a particular device. A bit mask value of zero indicates that that particular mirror is not enabled for use with the data storage device.

Portion 220*a* may also include flags 200. Included in the flags field 200 of FIG. 5 are the following: a WP or write pending flag 202, an invalid flag 204, and an incache flag 208. The WP flag 202 may be set (e.g., set to 1) for example, to indicate that the data associated with the track is write pending. As described in more detail elsewhere herein, a track of data associated with a write operation may be write pending. In one embodiment, rather than write data directly to a data storage device, data may first be written to cache. Data may be destaged at a later point in time from the cache to the actual data storage device. While the data is in the cache waiting to be destaged to the actual data storage, the WP flag 202 may be set to indicate that the cached data is waiting to be written out to the actual data storage device. The WP flag indicates that the cached data is the most recent copy of the data and differs from the actual content stored on the data storage device. The incache flag 208 indicates whether data for the corresponding track is stored in cache. If the data for the track is stored in cache, other fields of the entry in the track id table may identify a cache location at which the cached data is located.

In connection with the techniques described herein, the invalid bit or indicator 204 may be set (e.g., set to 1) to indicate that the associated entry in the track id table is not correct, is uninitialize, or does not otherwise contain valid data. For example, the invalid bit 204 may be set to indicate that the metadata about the track as stored in the track id table entry is not yet initialized, has been corrupted, or is otherwise in need of correction. In other words, when the invalid bit 204 is set, it indicates that the metadata stored in that particular entry of the track id table is not in a valid state in accordance with an expected data layout, values for particular fields, and the like, as illustrated, for example, in FIG. 5. In particular, when the invalid bit 204 is set, the CRC values in portion 220*b* may not include valid CRC values.

In connection with the techniques described herein, the invalid bit 204 may be set as part of performing initialization processing. As will be described in more detail in following paragraphs, the invalid bit 204 may be used in conjunction with the portion 220*b* for performing initialization processing of a device while deferring initialization of the corresponding data portion on the device and of the metadata as included in the corresponding entry in the track id table. In connection with initialization processing for a device, the invalid bit may be set and a corresponding signature value stored in the portion 220*b*. The device may then be made available for use such as in connection with I/O operations from the host. The initialization of the corresponding data portion on the device and completing initialization processing to have the track id table entry contain valid metadata information about the track may be performed at a later point after the device has been made available for use.

Once the associated track of data on the device has been initialized and the track id table updated to include valid metadata, the invalid bit 204 may be cleared (e.g., set to 0). As part of updating the track id table entry, the CRC values in portion 220*b* will also be modified to include appropriate valid values. Techniques will be described in following paragraphs which utilize the invalid bit 204 and portion 220*b* as may be included in the track id table for each track.

It should be noted that an embodiment may use different techniques in connection with data that is read from, or written to, devices in the data storage system. In one embodiment, a cache may be used in connection with processing data for read and write operations. In connection with a read operation, the DA may read the data requested from the device and store it in a cache slot included in cache. The DA, for example, may obtain a cache slot if there is not already one allocated and associated with a particular track id entry as indicated in the track id table 180. The data is read from the physical device by the DA and stored in the cache slot. Indicators associated with the cache slot, entry in the track id table, and other structures, may be appropriately updated in accordance with the data operation, the state of the data included in the cache slot, and the like. Data that is to be written to a device may be first stored in a cache slot and marked as a write pending (e.g. by setting the WP flag of 200). The data is then actually written out to the physical device at a later point in time. Use of a cache as a temporary holding place for received data to be written and other techniques may be employed in an embodiment to process the incoming write requests since the actual writing of data to a device may be characterized as comparatively slower when compared to the rate at which data is transferred to the target location.

For sake of simplicity to illustrate the techniques described herein for initializing a device, examples and descriptions will be set forth for initialization of a single device. It will be appreciated by those of ordinary skill in the art that the techniques described herein may be used in an embodiment with and without mirroring of devices, with and without RAID groupings, and the like.

As described above, the portion 220*b* may be used in connection with the techniques described herein to encode one or more signature values. When the invalid bit 204 is set, the portion 220*b* may be used to store a signature value. When the invalid bit 204 is clear, the portion 220*b* may be used to store the CRC values as indicated in FIG. 5. In one embodiment, a first signature value stored in portion 220*b* may be used to indicate that the metadata of the track id table entry is invalid and also that the corresponding data track on the device needs to be initialized. The first signature value may be used, for example, when defining a new logical device, bringing a new physical device online, and the like. Such processing may be performed, for example, in connection with performing a VTOC (Volume Table of Contents) for a device. A second different signature value in portion 220*b* may be used to indicate that the data stored in the corresponding track id table entry is invalid due to a detected corruption of the metadata stored therein. The second signature value may be used to indicate that the data portion of the device does not need to be initialized but rather to indicate that the metadata for the track id table entry needs to be recovered, for example, from a copy stored on disk as may be performed in subsequent processing.

An embodiment may also utilize other signatures to indicate a particular initialization state of the corresponding track id table entry and associated data portion on the device. For example, an application which has been aborted, detects corruption of an entry, or otherwise performs processing in connection with terminating in an abnormal state may appropriately set the invalid bit 204 and the portion 220*b* with a signature value.

An embodiment may associate one or more signature values with defined states of the track id table and/or device tracks as may be determined by a set of one or more application programs. When one of the application programs determines that the track id table and/or device tracks is in one of the defined states, the application program may accordingly set the invalid bit and store a signature in the portion 220*b* of the appropriate track id table entries. When subsequent processing finds the invalid bit set and a particular signature value in the table entries, it may be determined that the one or more application programs previously detected one of the defined states of the track id table, and/or device tracks.

The signature may be used to indicate one of a possible plurality of states of the track id table entry and corresponding device track. The signature may indicate a degree or level of initialization which needs to be performed to the track id table entry and/or the corresponding device track. When an application terminates, for example, the application may detect that the track id table entry and corresponding data portion is in one of the plurality of different states and accordingly set the invalid bit and signature in portion 220b. Such information in the signature portion 220b may be used in connection with subsequently performing different processing in accordance with the particular state of the track id table and corresponding data portion on the device.

Figure 6:
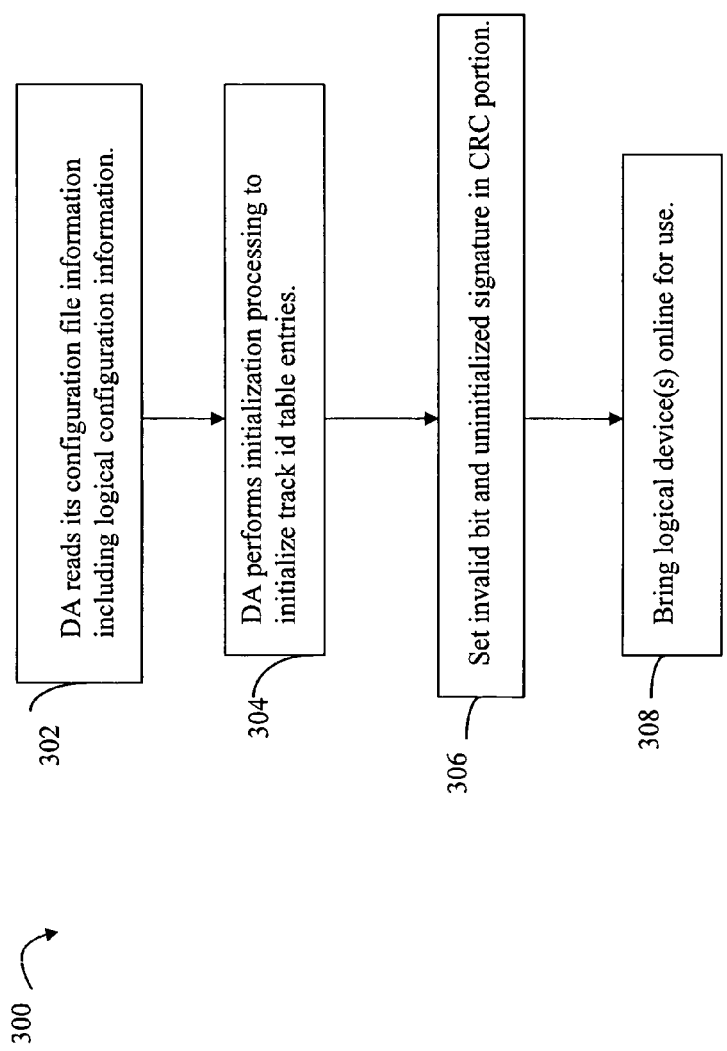
FIG. 6 is a flowchart of processing steps that may be performed in an embodiment by a disk adapter (DA) in connection with device initialization.

Referring now to FIG. 6, shown is a flowchart 300 of processing steps that may be performed in an embodiment in connection with the techniques described herein. The steps of 300 may be performed by a DA in connection with initialization of a device. The steps of 300 may be performed, for example, when a new LV is defined, a new physical device is brought online, and the like, in which one or more entries of the track id table may be initialized. Each DA may perform the processing steps of 300. At step 302, the DA reads its configuration file information including logical configuration information. The configuration information may include, for example, which physical tracks of a device correspond to each LV defined. The DA may perform initialization processing for those portions of devices under the DA's control. At step 304, the DA performs initialization processing to initialize the track id table entries for those portions of the devices in accordance with the configuration information. At step 306, the DA sets the invalid bit and enters the appropriate signature into the CRC portion 220b for each track id table entry being initialized. At step 308, the DA may set, or otherwise communicate to another component, that the logical devices (e.g., LVs) for which processing at step 306 has been performed are now available for use. The initialization of the data portion on the device corresponding to those track id table entries for which step 306 has been performed has been deferred and may be performed after step 308. Thus, the devices for which steps of flowchart 300 have been performed may become available for use without having initialized the physical device portions, for example, such as by writing out an initialization data pattern to the disk and also without having valid metadata in the track id table entries for the newly added device(s).

The initialization of the data portion of the device and accordingly updating the track id table entry with valid metadata may be deferred and subsequently performed at any one or more different points in time. In one embodiment, such processing may be performed when a subsequent I/O operation is performed to the particular track. In other words, each track of a device may remain uninitialized until referenced in connection with a read or write operation. An embodiment may also perform background initialization processing to complete initialization of the actual device portions and associated track id table entries.

Figure 7:
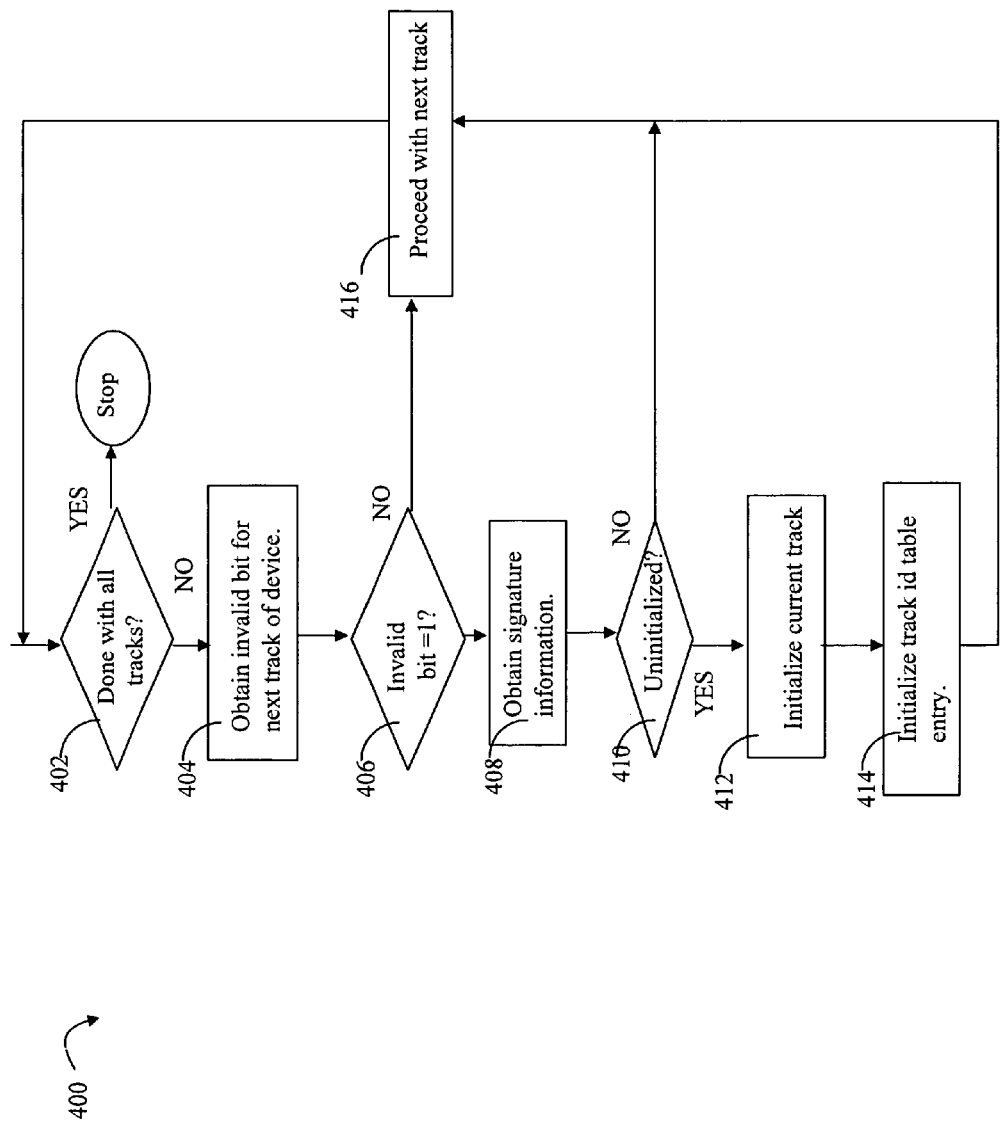
FIG. 7 is a flowchart of processing steps that may be performed in an embodiment by a background initialization process.

Referring now to FIG. 7, shown is a flowchart 400 of processing steps that may performed in an embodiment in connection with the background initialization processing. The background initialization process may execute as a background task continually scanning all of the tracks in the track id table looking for invalid bit=1 and the appropriate signature value in 220b, and initializing those particular tracks of the device. This background process as described in connection with FIG. 7 may be performed in an ongoing manner while also allowing other data operations or requests to the data storage device. The processing steps of flowchart 400 describe in more detail the background initialization processing as may be performed, for example, by each DA that may be included in an embodiment.

At step 402, a determination is made as to whether processing is done for all of the tracks on a device. If so, processing stops for track initialization on that particular device. Processing as may be performed by the background task may continue with a next device for the continuous ongoing scanning. If all of the tracks associated with a current device at step 402 have not been processed, control proceeds to step 404 where the invalid bit value for the next track of the current device is obtained. At step 406, a determination is made as to whether the invalid bit read at step 404 is set (e.g., =1). If the invalid bit is not set (e.g., =0), control proceeds to step 416 to continue processing with the next track. Otherwise, if the invalid bit is set, control proceeds to step 408 to obtain the signature value as stored in portion 220b of the track id table entry. At step 410, a determination is made as to whether the signature value indicates that the track id table entry is uninitialized and that the corresponding physical track on the device has not yet been initialized. If step 410 evaluates to no, control proceeds to step 416. Otherwise, if step 416 evaluates to yes, control proceeds to step 412 to initialize the current track on the device such as by writing out an initialization pattern to the track. Control proceeds to step 414 to initialize the track id table entry. Processing of step 414 may include, for example, clearing the invalid bit, updating the portion 220b with appropriate CRC values, and the like. Processing continues with the next track at step 416. It should be noted that the processing of flowchart 400 is written with respect to initialization of tracks on a single device. When initialization processing for the device is complete, the background task may continue executing the steps of flowchart 400 with the next device.

The DA may execute the background task performing initialization processing while also handling data requests to the devices serviced by the DA. I/O operations may be allowed to a device which has been processed in accordance with the steps of flowchart 300 of FIG. 6, (e.g., resulting in invalid bit and appropriate signature settings) so that I/O operations requests may be performed prior to physically initializing tracks on the device.

It should be noted that the initialization techniques described herein using the invalid bit and signature may be performed for selected one or more LVs. In one embodiment, part of the configuration information for a particular LV may designate whether the initialization techniques described herein are performed in connection with tracks for selected LVs. An embodiment may also enable/disable use of the techniques herein for all LVs, as well as LVs associated with certain DAs. In one embodiment, the techniques described herein may be enabled/disable for selected LVs in accordance with the particular type of data stored on the selected LVs such as, for example, LVs including array-specific meta data, or other types of data. The particular level of enablement/disablement of the initialization techniques described herein may vary with embodiment.

Figure 8:
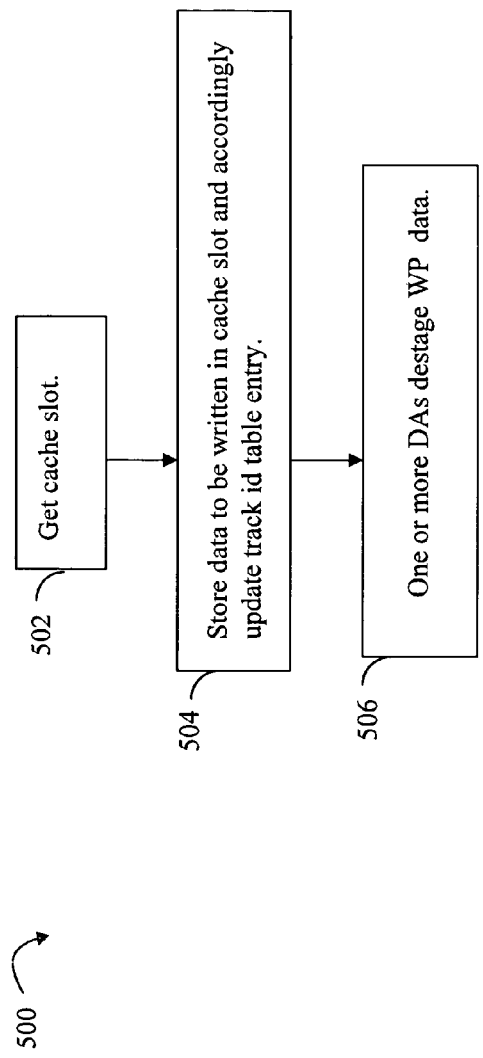
FIG. 8 is a flowchart of processing steps that may be performed in an embodiment in connection with writing data to a device.

Referring now to FIG. 8, shown is a flowchart of processing steps that may be performed in connection with writing data to a device. The processing steps may be performed in connection with writing out the initialization pattern to a device track as well as writing data of a write operation to the device track. At step 502, a cache slot is obtained for the data operation. As will be appreciated by those skilled in the art, a cache slot may be obtained from a pool of available cache slots or may otherwise already contain data for a particular track such as data that has been destaged but is still in the cache. At step 504, the cache slot is initialized with the data to be written to the device, such as the initialization pattern. The track id table entry is also updated as part of step 504 processing to reflect the use of the particular cache slot and WP status. At some point in time later, the DA destages the WP data, as in step 506.

Figure 9:
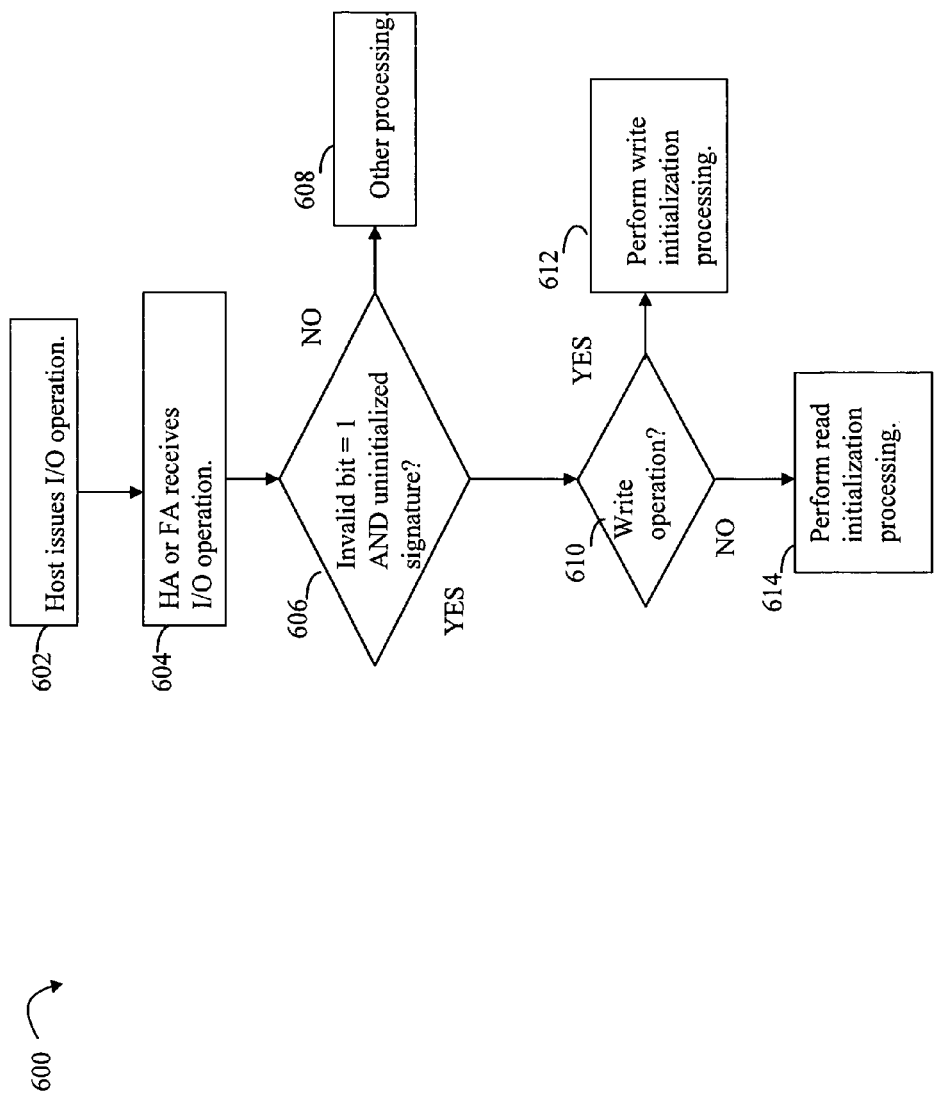
FIG. 9 is a flowchart of processing steps that may be performed in an embodiment in connection with processing an I/O operation.

Referring now to FIG. 9, shown is a flowchart of processing steps that may be performed by a data storage system in connection with handling a data request for a device using the techniques described herein. Such a device may have tracks on the device which are not yet initialized. At step 602, the host may issue an I/O operation request. At step 604, the HA, FA, or other adapter in communication with the host receives the I/O operation request. At step 606, the adapter receiving the request obtains information from the track id table for the track(s) associated with the I/O request. The adapter determines whether the invalid bit and signature of the track id table entry indicate that the device track and associated track id table entry are uninitialized. If not, control proceeds to step 608 to perform other processing. If step 606 evaluates to yes, control proceeds to step 610 to determine if the I/O operation received is a write operation request. If so, control proceeds to step 612 to perform write initialization processing. Otherwise, control proceeds to step 614 to perform read initialization processing. It should be noted that steps 612 and 614 are described in more detail in following paragraphs.

In connection with performing the initialization processing of steps 612 and/or 614, the receiving adapter (e.g., HA, FA) may perform the initialization processing steps with the exception of writing data out to the physical device from cache (e.g., destaging any WP data). Alternatively, the receiving adapter may otherwise issue commands instructing the DA to perform the initialization processing and communicate with the receiving adapter when the initialization processing is complete.

Figure 10:
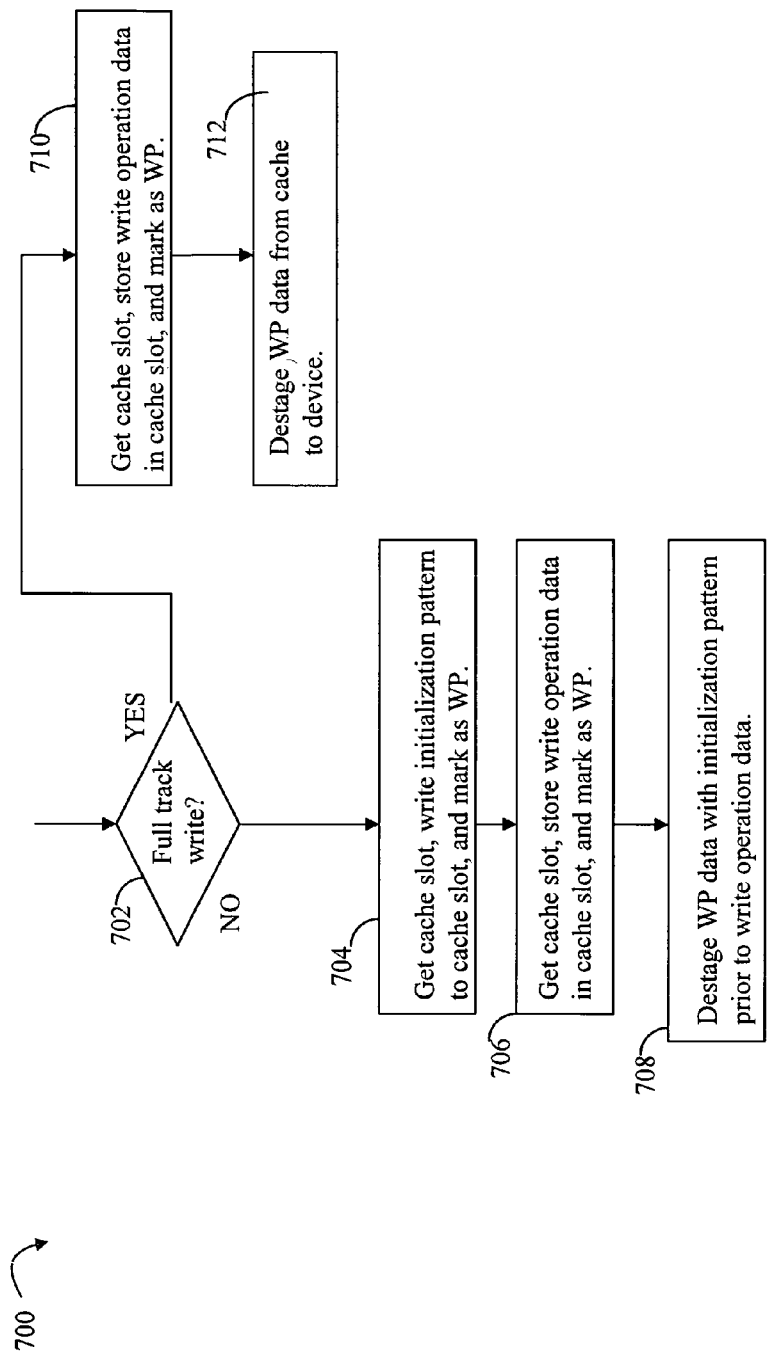
FIGS. 10-11 are flowcharts of processing steps that may be performed in an embodiment in connection with performing a write operation.

Referring now to FIG. 10, shown is a flowchart of processing steps as may be performed in an embodiment for write initialization processing. The flowchart 700 illustrates steps that may be performed in one embodiment in connection with write initialization processing of step 612 of flowchart 600. At step 702, a determination is made as to whether the write is a full track write. If so, processing may be performed to write out the entire track without first writing out the initialization pattern to the track. Control proceeds to step 710 to obtain a cache slot, store the write operation data in the cache slot, and accordingly update the track id table entry which includes setting the WP indicator. At some point later, the WP data is destaged to the device at step 712.

If step 702 evaluates to no, control proceeds to step 704 to perform processing steps to initialize the track by writing out an initialization pattern to the device track and then writing out the write operation data to the device track. At step 704, a cache slot is obtained and the initialization pattern is stored in the cache slot as the data to be written out to the device track. Additionally, the corresponding track id table entry is updated, for example, to indicate the WP operation. At step 706, a cache slot is obtained in which the write operation data is stored to be written out to the device track. The corresponding track id table entry is updated as in step 704. At step 708, the WP data is destaged with the initialization pattern written out prior to the write operation data. As will be appreciated by those skilled in the art, the destaging of data occurs in the proper order but may occur in an asynchronous fashion. As such, for example, the WP data for the initialization pattern may be destaged prior to step 706.

Figure 11:
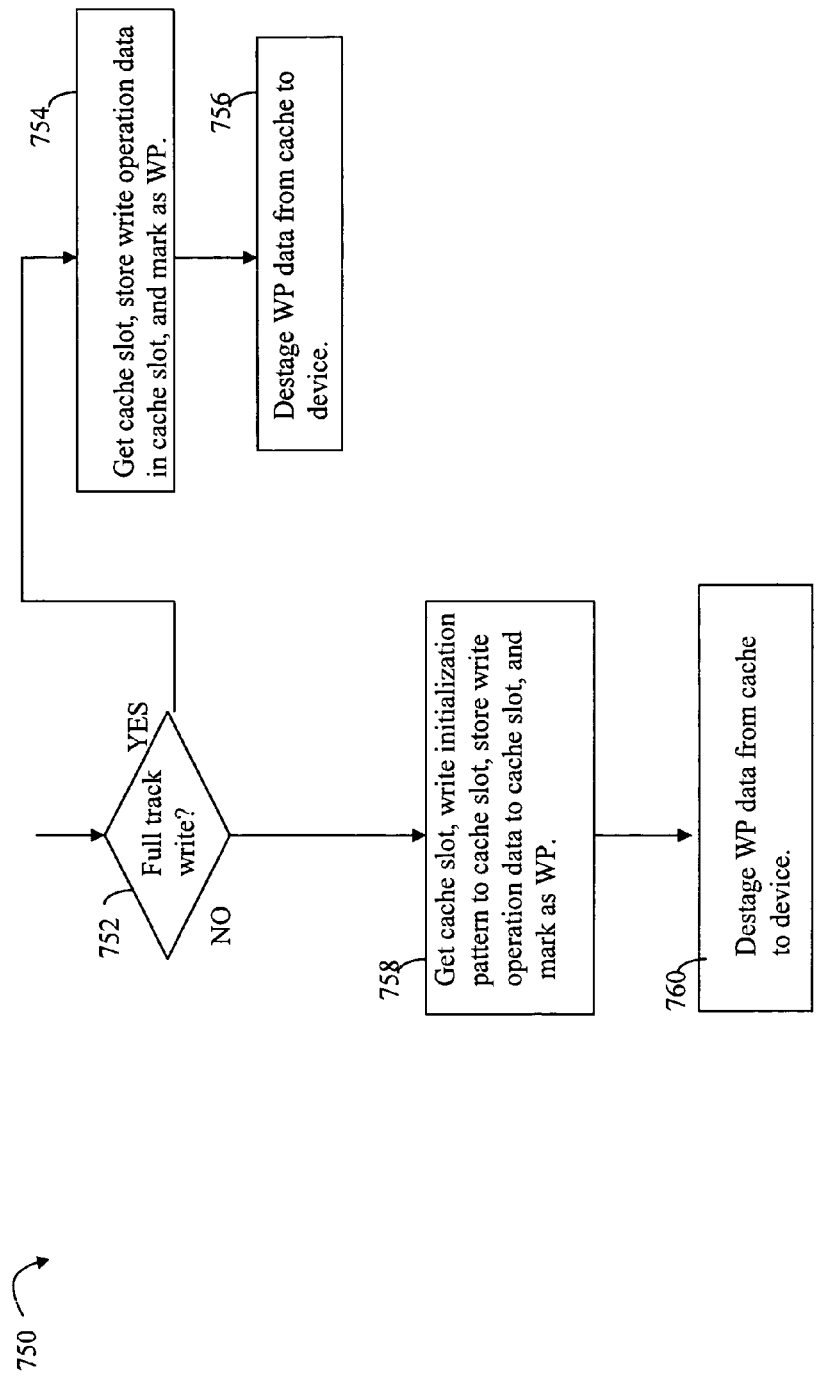

Referring now to FIG. 11, shown is a flowchart of processing steps as may be performed in another embodiment for write initialization processing. The flowchart 750 illustrates steps that may be performed in one embodiment in connection with write initialization processing of step 612 of flowchart 600 and may be performed as an alternative to processing steps of flowchart 700. It should be noted that steps 752, 754, and 756 are similar, respectively, to steps 702, 710 and 712 of flowchart 700. The steps 758 and 760 initialize the device track by writing out the initialization pattern to the cache slot and then updating the cache slot to also include the write operation data. The composite or result of writing the initialization pattern and the write operation data may be performed with respect to the same cache slot before destaging the data to the device. At step 758, a cache slot is obtained and the initialization pattern is stored in the cache slot. Subsequently, the write operation data is stored to the cache slot and the corresponding track id table entry is updated, for example, to indicate the data in the cache slot as WP. At step 760, the WP data is later destaged to the device.

Figure 12:
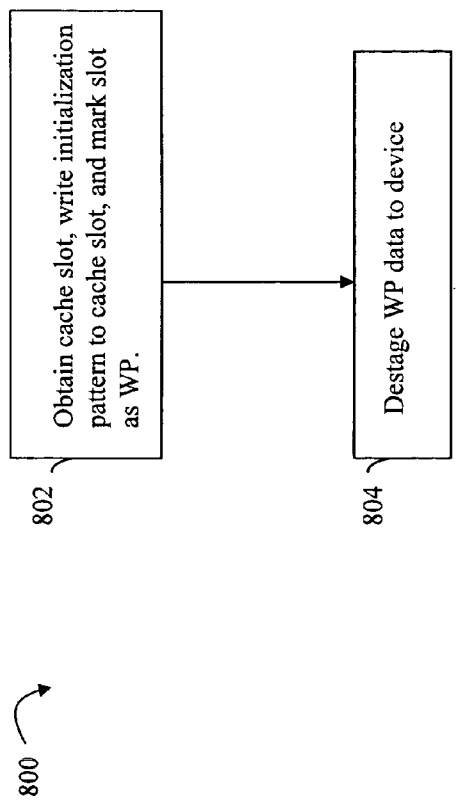
FIG. 12 is a flowchart of processing steps that may be performed in an embodiment in connection with performing a read operation.

Referring now to FIG. 12, shown is a flowchart of processing steps as may be performed in an embodiment for read initialization processing. The flowchart 800 illustrates steps that may be performed in connection with read processing initialization of step 614 of flowchart 600. At step 802, a cache slot is obtained and the initialization pattern is written to the cache slot as data to be written out to the device track. The track id table entry for the track is accordingly updated including marking the cache slot as containing WP data. At step 804, the WP data of the cache slot from step 802 is destaged at a later point in time.

In connection with a read operation to a device track which has not yet been initialized, an embodiment may alternatively return a fixed pattern of data, for example, corresponding to the initialization pattern rather than performing the processing steps of flowchart 800 of FIG. 12. Such an embodiment may perform write initialization processing as described herein and may also utilize a background task to initialize remaining portions of the device tracks. Such an embodiment may also, for example, utilize a scratch data area, such as a scratch cache slot, to store the initialization pattern that is returned in connection with the read operation. In other words, the read operation may not cause initialization of the device track and may not result in initializing the track's entry with valid metadata.

As described herein, some level of initialization processing may be performed as a result of an application determining that such initialization processing of a device is needed. For example, a snapshot application may be used in connection with making a snapshot or point in time copy of data from a first device to a second device. While the snapshot of data is in the process of being copied to the second device, a read operation to access data on the second device may be redirected to use a copy of data on the first device if the data has not yet been copied from the first device to the second device. If a snapshot application session is terminated prior to completion of making the snapshot on the second device, the snapshot application may utilize the techniques described herein to indicate that the second device requires some degree of initialization processing due to the incomplete and aborted snapshot operation. In one embodiment, the snapshot application may set the invalid bit and use a first signature to indicate that the tracks of the second device are not initialized and that corresponding metadata of the track id table entries are invalid. This first signature may also be the signature used in connection with performing a VTOC. An embodiment may alternatively have the snapshot application as described above set the appropriate fields of the track id table entries for tracks of the second device to a different signature than the first signature. The different signature may indicate that initialization of the track id table entries and device tracks is needed and may also indicate that the snapshot application is setting the invalid bit. The snapshot application is one example of an application that may use the techniques described herein to indicate that some degree of initialization processing is needed in connection with the detected state of the application. The particular degree or variations of initialization processing that may be performed may be indicated using the invalid bit in combination with a signature. Different signatures may be used to indicate the variations in initialization processing that may subsequently be performed. The signature may also be used to indicate the particular application that made a determination regarding the state of the track id table entry and/or associated device track of data.

The use of the techniques described herein allows for deferred initialization of the device tracks (e.g., by writing out an initialization pattern to the device). The signature as described herein associated with a VTOC relates to initialization of a new physical or logical device which is being brought on line for a first time. The techniques described herein for initialization processing may be performed on the data storage system when bringing the new device online. The techniques described herein may defer initialization of device tracks associated with user addressable or host accessible portions of the device including user data, such as LVs. Additionally, the techniques described herein may also be used to defer initialization of device tracks used for non-user data which are not accessible or otherwise addressable by a host. An example of the non-user data portions may relate to device or cache metadata. Such metadata may include, for example, device header information, device label information, metadata relating to the logical structure of a physical device, and the like.

Figure 13:
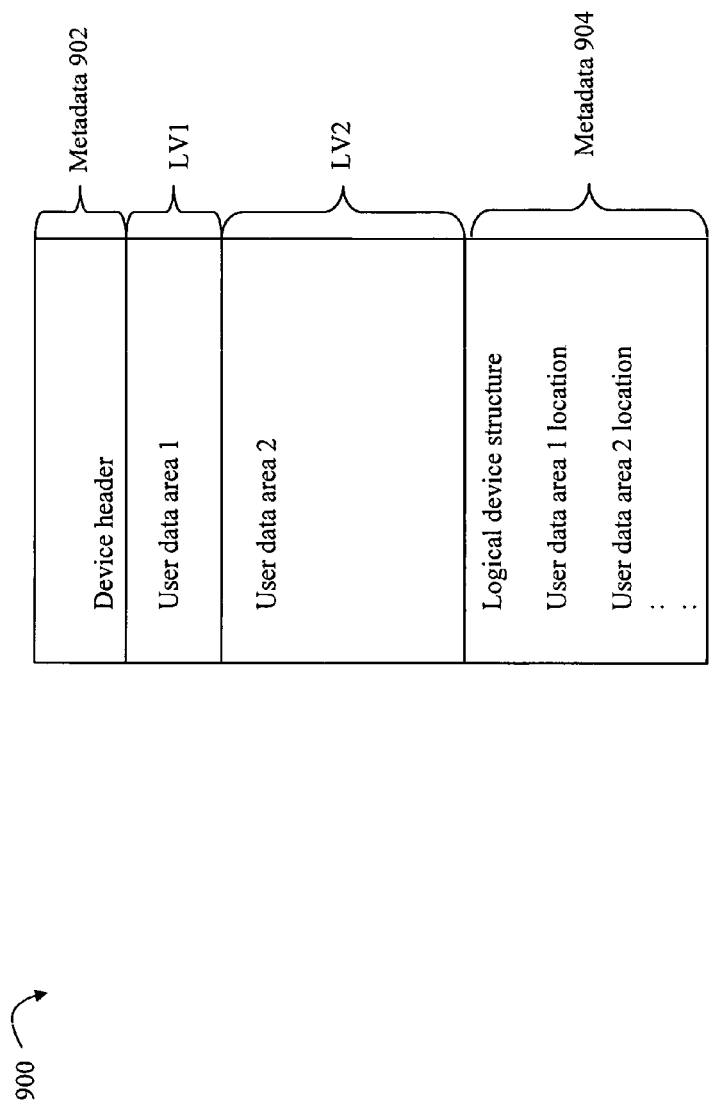
FIG. 13 is an example illustrating the types of data as may be stored in different portions of a device.

Referring now to FIG. 13, shown is an example illustrating the types of data as may be stored in different portions of a physical device. The example 900 illustrates the different types of data that may be stored on different tracks of a physical device. The example 900 includes user or host addressable portions LV1 and LV2 and non-host addressable portions 902 and 904 which in this example include device metadata. The first metadata portion 902 in this example includes device header information, which may include a device label, and may be stored on the first tracks of the physical device. Metadata portion 904 in this example may include metadata describing the logical structure of user data on the device. The portion 904 may identify, for example, information regarding the logical configuration of the physical device and other logical device characteristics that may be persistently stored as metadata. The deferred initialization techniques described herein may be used in connection with deferring initialization of the physical device tracks of user data portions, such as LV1 and LV2. The deferred initialization techniques described herein may also be used in connection with deferring initialization of the metadata portions, such as 902 and 904.

It should be noted that in connection with performing initialization of the device tracks which had been previously deferred using the techniques described herein, the initialization of the device tracks may be interrupted, for example, in connection with performing a host I/O operation. If a RAID grouping includes such a device whose device track initialization is interrupted, an embodiment may destage all the currently WP data for the device and not have any associated RAID parity information until all devices of the RAID grouping have had their tracks initialized.

It should be noted that in connection with the techniques described herein, an embodiment may utilize any one or more locking and synchronization techniques known to those skilled in the art to access a resource which may be utilized by multiple components of the data storage system.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for initializing a device in a data storage system comprising:
    setting an indicator in an entry associated with a portion of said device indicating that said portion of said device is to be initialized, wherein, when said indicator is clear, said indicator indicates that said portion of said device has been initialized and that said entry includes valid metadata for said portion;
    setting a signature field in said entry with a signature value indicating that said portion of said device is to be initialized; and
    indicating that said device is available for use after setting said indicator and said signature field for each portion of said device, said device having one or more portions, each of said portions having a corresponding entry including an instance of said indicator and an instance of said signature field for said each portion, wherein said device is indicated as available for use without having initialized each portion of said device and without the corresponding entry for each portion of the device having valid metadata.

2. The method of claim 1, wherein said signature value is a first of a plurality of signature values, each of said signature values indicating an initialization state of said entry and said portion of said device.

3. The method of claim 2, wherein said first signature value indicates that said entry includes invalid metadata describing said portion of said device.

4. The method of claim 1, further comprising:
    writing an initialization value to said portion of said device, and, in response to writing said initialization value, updating said entry by clearing said indicator in said entry, and setting said signature field in said entry to another value determined in accordance with the initialization value written to said portion of said device.

5. The method of claim 1, wherein said portion of said device corresponds to a portion of a physical device which includes user data.

6. The method of claim 1, wherein said portion of said device corresponds to a portion of a physical device which includes metadata about said device.

7. The method of claim 6, wherein said portion is not addressable by a host performing I/O operations to said device.

8. The method of claim 1, wherein said device is a new logical device, and said setting steps are performed as part of initializing entries in a table including information about physical device tracks included in said new logical device.

9. The method of claim 1, further comprising:
    performing an I/O operation request to said portion; and
    initializing said portion of said device by writing an initialization value to said portion of said device in response to receiving said I/O operation request if said portion is determined to not be initialized in accordance with values of said indicator and said signature field.

10. The method of claim 1, further comprising:
performing an I/O operation request to said portion;
determining if said portion has been initialized using values of said indicator and said signature portion;
if said I/O operation is a write operation and said portion has not been initialized, performing write initialization processing in accordance with values of said indicator and said signature field; and
if said I/O operation is a read operation and said portion has not been initialized, performing read initialization processing in accordance with said values of said indicator and said signature field.

11. The method of claim 1, wherein a background process examines entries in a device table, each entry corresponding to a different portion of said device, the background process initializing portions of said device in accordance with values of the indicator and the signature field of each of said entries corresponding to one of said portions.

12. A method for initializing a device in a data storage system comprising:
setting an indicator in an entry associated with a portion of said device indicating that said portion of said device is to be initialized;
setting a signature field in said entry with a signature value indicating that said portion of said device is to be initialized; and
indicating that said device is available for use after setting said indicator and said signature field for each portion of said device, said device having one or more portions, each of said portions having a corresponding entry including an indicator and a signature field for said each portion wherein said signature value is a first of a plurality of signature values, each of said signature values indicating an initialization state of said entry and said portion of said device, and wherein said first signature value indicates that said entry includes invalid metadata describing said portion of said device, and wherein, when said entry includes valid metadata describing said portion, said signature field includes a value used in connection with performing data validation when data included in said portion of said device is transmitted rather than a signature value.

13. A method for initializing a device in a data storage system comprising:
setting an indicator in an entry associated with a portion of said device indicating that said portion of said device is to be initialized;
setting a signature field in said entry with a signature value indicating that said portion of said device is to be initialized;
indicating that said device is available for use after setting said indicator and said signature field for each portion of said device, said device having one or more portions each of said portions having a corresponding entry including an indicator and a signature field for said each portion;
performing an I/O operation request to said portion;
determining if said portion has been initialized using values of said indicator and said signature portion;
if said I/O operation is a write operation and said portion has not been initialized, performing write initialization processing in accordance with values of said indicator and said signature field; and
if said I/O operation is a read operation and said portion has not been initialized performing read initialization processing in accordance with said values of said indicator and said signature field, and
wherein said write initialization processing includes:
determining if said write operation is a full write operation to write data to said entire portion; and
if said write operation is a full write operation, storing write operation data to said portion without storing an initialization value to said portion.

14. The method of claim 13, further comprising:
if said write operation is not a full write operation, storing an initialization value to said portion prior to storing write operation data to said portion.

15. The method of claim 13, further comprising:
if said write operation is not a full write operation, storing an initialization value in a cache slot associated with said portion, storing write operation data to said cache slot associated with said portion, and destaging the data in the cache slot to the portion.

16. A method for initializing a device in a data storage system comprising:
setting an indicator in an entry associated with a portion of said device indicating that said portion of said device is to be initialized;
setting a signature field in said entry with a signature value indicating that said portion of said device is to be initialized;
indicating that said device is available for use after setting said indicator and said signature field for each portion of said device, said device having one or more portions, each of said portions having a corresponding entry including an indicator and a signature field for said each portion;
performing an I/O operation request to said portion;
determining if said portion has been initialized using values of said indicator and said signature portion;
if said I/O operation is a write operation and said portion has not been initialized, performing write initialization processing in accordance with values of said indicator and said signature field; and
if said I/O operation is a read operation and said portion has not been initialized, performing read initialization processing in accordance with said values of said indicator and said signature field, and wherein said read initialization processing does not initialize said entry to include valid metadata, does not initialize said portion of said device corresponding to said entry, and returns an initialization pattern in response to said read operation.

17. A computer-readable medium including code stored thereon for initializing a device in a data storage system, the computer-readable medium including code that:
sets an indicator in an entry associated with a portion of said device indicating that said portion of said device is to be initialized, wherein, when said indicator is clear, said indicator indicates that said portion of said device has been initialized and that said entry includes valid metadata for said portion;
sets a signature field in said entry with a signature value indicating that said portion of said device is to be initialized; and
indicates that said device is available for use after setting said indicator and said signature field for each portion of said device, said device having one or more portions, each of said portions having a corresponding entry including an instance of said indicator and an instance of said signature field for said each portion, wherein said device is indicated as available for use without having initialized each portion of said device and without the corresponding entry for each portion of the device having valid metadata.

18. The computer-readable medium of claim 17, wherein said signature value is a first of a plurality of signature values, each of said signature values indicating an initialization state of said entry and said portion of said device.

19. The computer-readable medium of claim 18, wherein said first signature value indicates that said entry includes invalid metadata describing said portion of said device.

20. A computer-readable medium including code stored thereon for initializing a device in a data storage system, the computer-readable medium including code that:
   sets an indicator in an entry associated with a portion of said device indicating that said portion of said device is to be initialized;
   sets a signature field in said entry with a signature value indicating that said portion of said device is to be initialized;
   indicates that said device is available for use after setting said indicator and said signature field for each portion of said device said device having one or more portions, each of said portions having a corresponding entry including an indicator and a signature field for said each portion, wherein said signature value is a first of a plurality of signature values each of said signature values indicating an initialization state of said entry and said portion of said device, and wherein said first signature value indicates that said entry includes invalid metadata describing said portion of said device and wherein, when said entry includes valid metadata describing said portion, said signature field includes a value used in connection with performing data validation when data included in said portion of said device is transmitted rather than a signature value.

* * * * *